Dec. 22, 1959     J. S. STELZER     2,918,155
THROTTLE CONTROL

Filed April 10, 1957     2 Sheets-Sheet 1

INVENTOR.
JAMES S. STELZER
BY
RICHEY, WATTS, EDGERTON,
McNENNY & FARRINGTON
Donald W. Farrington
ATTORNEYS Dec. 22, 1959  J. S. STELZER  2,918,155
THROTTLE CONTROL
Filed April 10, 1957  2 Sheets-Sheet 2
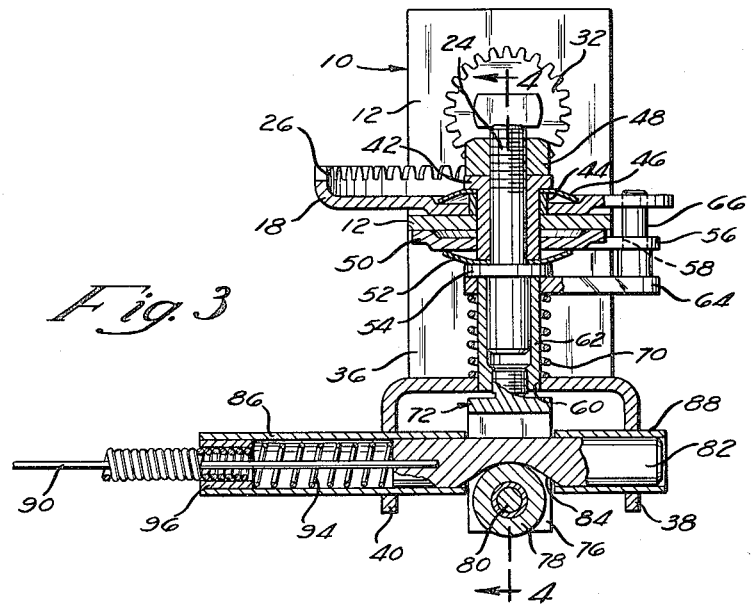
Fig. 3
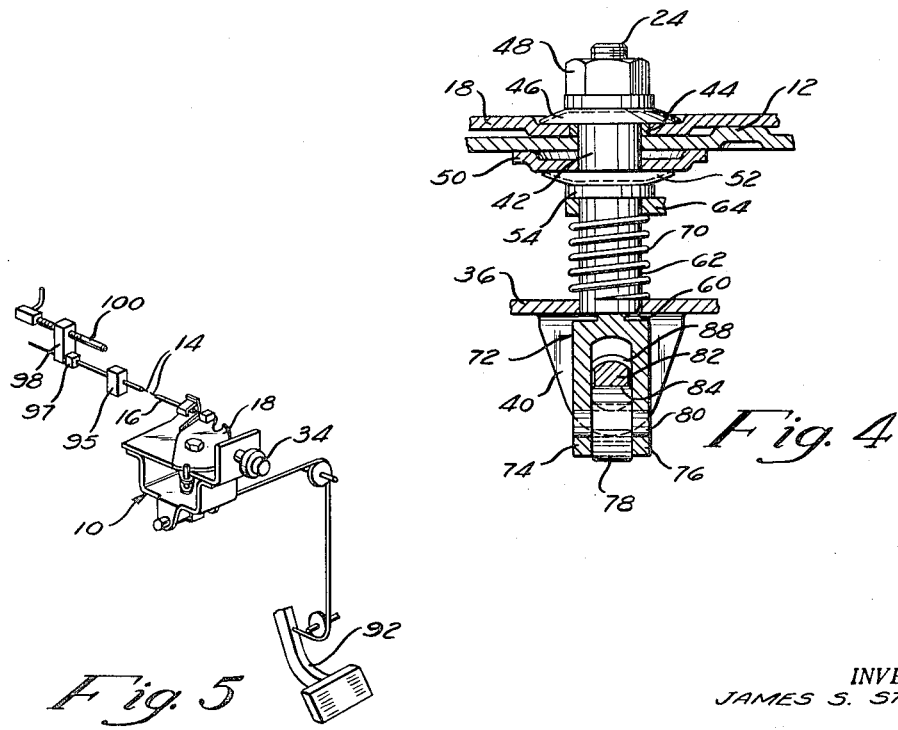
Fig. 4
Fig. 5
INVENTOR.
JAMES S. STELZER
BY
RICHEY, WATTS, EDGERTON,
McNENNY & FARRINGTON
Donald W. Farrington
ATTORNEYS United States Patent Office 2,918,155
Patented Dec. 22, 1959

2,918,155

THROTTLE CONTROL

James S. Stelzer, Fort Wayne, Ind., assignor to The Weatherhead Company, Cleveland, Ohio, a corporation of Ohio Application April 10, 1957, Serial No. 651,896

7 Claims. (Cl. 192—3)

This invention relates to a linkage control apparatus and more particularly to an accessory adaptable for controlling the throttle position of a vehicle propelling engine.

Broadly, this invention comprehends the provision of a manually adjustable device applicable to motor vehicles and the like for maintaining a predetermined and pre-set throttle position thereof and further being responsive to application of the vehicle brake to instantly release the throttle linkage to return the throttle to engine idling position.

This invention is particularly applicable to automotive vehicles although it is to be understood that the same may be effectively employed for controlling the throttle position of many other engines and motors for propelling vehicles and for other uses.

In the operation of automobiles, to which this invention is particularly applicable, it frequently occurs that a steady and constant motor speed must be maintained over long distances and consequently for prolonged periods of time. Under such circumstances the operator of the automobile frequently becomes weary and fatigued, particularly by reason of the fact that his foot must, for such prolonged periods of time, remain in the same position on the foot actuated throttle or accelerator pedal. In addition to driver discomfort, such fatigue creates a driving hazard in that it decreases the operator's acumen and physical responsiveness in emergency situations requiring a quick application of the vehicle brakes, steering or other action.

The foregoing described undesirable fatigue and weariness can in large measure be overcome by the provision of device for mechanically maintaining a pre-set throttle position to maintain a desired, constant vehicle speed and therefore to enable various, and more restful positions of the operator's foot. A sacrifice of vehicle safety can be avoided with the additional provision of means for instantly releasing the throttle upon the slightest application of the vehicle brake so as to reduce the vehicle engine speed to an idle and to benefit by the motion retarding effect thereof in the usual manner.

Accordingly, it is an object of this invention to provide a motor vehicle accessory that is simple, inexpensive, effective and efficient to accomplish the purposes herein described.

It is another object of this invention to provide a motor vehicle throttle control device for releasably maintaining the vehicle throttle at any manually pre-set position to relieve the operator of constant manual application thereto.

It is another object of this invention to provide a motor vehicle throttle control device for maintaining a pre-set throttle position and incorporating means actuable by application of the vehicle brakes to instantly render the control device inoperative and to return the throttle to engine idling condition.

It is another object of this invention to provide a motor vehicle throttle control device for releasably maintaining the vehicle throttle at any manually pre-set position and enabling manual re-setting of said control means to any other desired position thereof.

Other and further objects and advantages of this invention will become apparent from a more detailed description thereof considered with the accompanying drawings in which:

Fig. 3 illustrates a cross-sectional elevational view of a portion of the invention taken along section 3—3 of Fig. 1;

Fig. 4 illustrates a cross-sectional view of a portion of the invention taken along section 4—4 of Fig. 3; and Fig. 5 illustrates a perspective view of the invention as applied to a motor vehicle.

Figure 1:
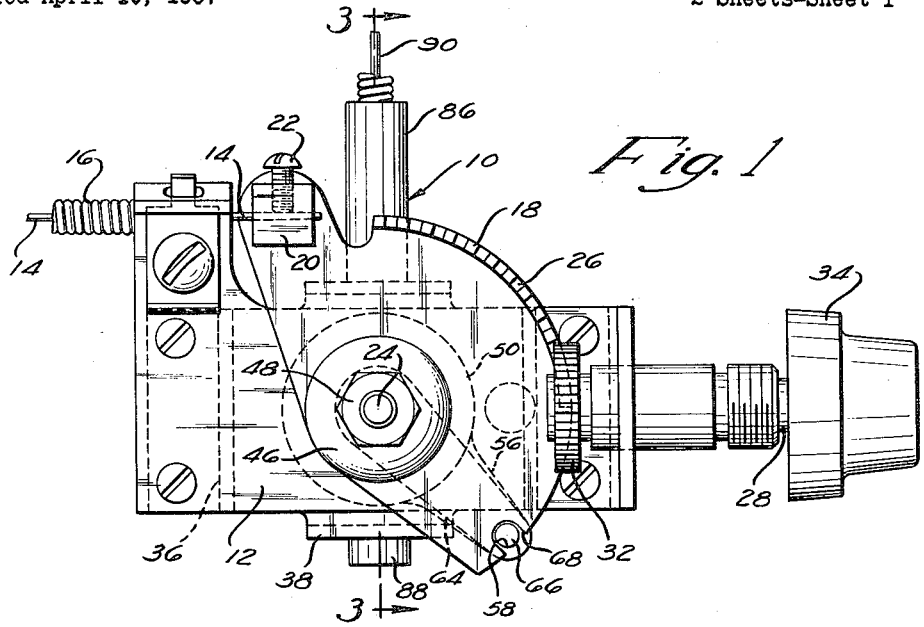
Fig. 1 illustrates a plan view of a throttle control mechanism according to the invention.

For a better understanding of the advantages of this invention reference is had to Fig. 1 wherein 10 represents generally the throttle control mechanism of this invention which includes a throttle control bracket 12 for mounting and supporting the throttle control mechanism on a vehicle dash or the like. The throttle control mechanism 10 is adaptable for controlling the position of the vehicle throttle linkage through a wire 14, enclosed by a wire sheath 16, and connected at one end to the throttle linkage and at the other end to a quadrant 18 of the mechanism 10 through a swivel block 20 and set screw 22. Quadrant 18 is pivotal about a shaft 24 and is provided with a gear quadrant 26 integral with or secured to quadrant 18 along one edge thereof. A shaft 28 mounted for rotation in bracket 12 is provided with a spur gear 32 at one end, which is in engagement with gear quadrant 26, and a manually rotatable knob 34 at the other end. As may be understood, rotation of knob 34 is effective to pivot quadrant 28 about shaft 24 and to impart a generally linear motion to wire 14 through the swivel block 20 connected to the quadrant 28. The throttle linkage of the vehicle may be adjusted over its range by merely adjusting the position of wire 14 by rotation of knob 34 as described. The throttle linkage together with the parts of the control mechanism are retained in position after having been once set by knob 34 in a manner to be made clear hereinbelow. Accordingly, the throttle position and speed of a vehicle may be adjusted and kept steady for prolonged periods by a mere positioning of knob 34.

Figure 2:
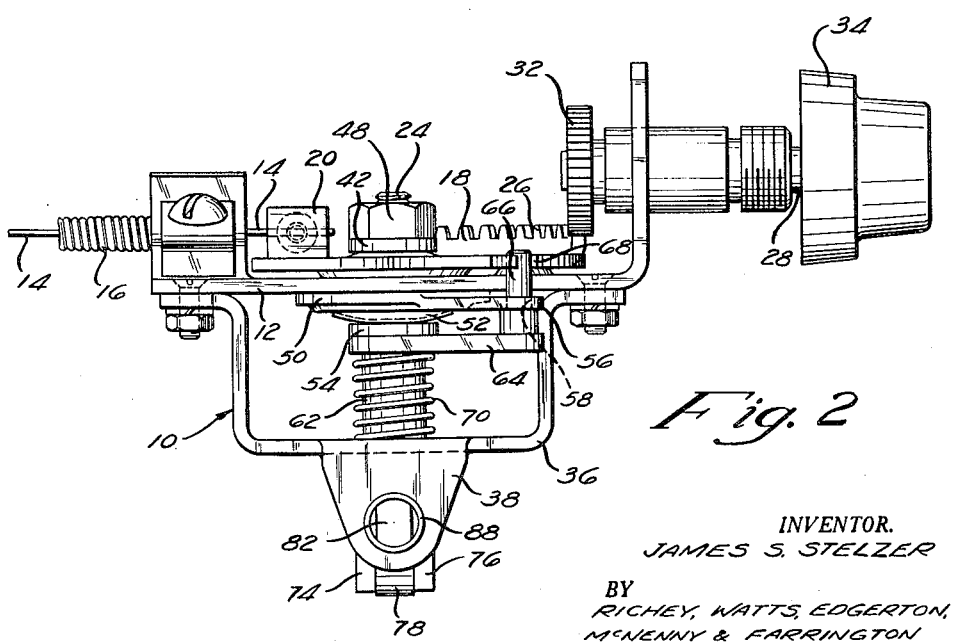
Fig. 2 illustrates an elevational view of the mechanism shown in Fig. 1.

Referring now more particularly to Figs. 2, 3 and 4 of the drawings, 36 represents a latch mounting bracket secured at respective ends to bracket 12 by screws or other suitable means and having a pair of depending and apertured ears, 38 and 40 for receiving a throttle release mechanism responsive to vehicle brake application to return the throttle linkage together with the various throttle control mechanism components to their original position.

As seen more clearly in Fig. 3 of the drawings, quadrant 18 supported about shaft 24 is spaced therefrom by a spacer bushing 42 which extends through an aperture in bracket 12 and a spacer 44 surrounding shaft 24. A retaining spring 46 is interposed between a shoulder of bushing 42 and the end of spacer 44 for urging quadrant 18 against fixed bracket 12. Bushing 42, spacer 44 and spring 46 are secured in position about shaft 24 by a nut 48 threaded on the shaft and bearing against the end of bushing 42.

Also mounted about bushing 42 below bracket 12 is a friction plate 50 having a peripheral portion urged into engagement with the bracket by a spring 52 secured between the end of bushing 42 and a shoulder 54 on shaft 24. Friction plate 50 is also provided with an arm 56 extending radially therefrom and having an aperture 58 near the outer end co-operative with other parts of the control apparatus to retain quadrant 18 in any preset position against the influence of the vehicle spring biased throttle linkage. Bracket 36 is provided with an aperture 60 for receiving a latch guide bushing 62 slidable along the lower end of shaft 24 and through aperture 60. Fixedly secured to the upper end of bushing 62 is an arm 64 radially extending therefrom and below arm 56. An axial pin 66 is secured to arm 64 near its outer end and extends through aperture 58 in friction plate 50 and into a notch 68 in quadrant 18 for effecting unitary rotation of these parts in one condition of operation. It is noted that by virtue of the frictional engagement between friction plate 50 and bracket 12 and of the coupling between frictional plate 50 and quadrant 18 through pin 66, friction plate 50 is effective to retain quadrant 18 in position despite the influence of the spring bias of the vehicle throttle linkage acting through wire 14 on quadrant 18.

Arm 64 and bushing 62 are urged upwardly, as viewed in the figures of the drawings, by a spring 70 coiled about bushing 62 and bearing at one end against arm 64 and at the other end against a surface of fixed bracket 36. Accordingly, quadrant 18 is retained in position as hereinabove described unless pin 66 is withdrawn against the force of spring 70, to allow return of the same to initial position. The lower end of bushing 62 is preferably threadedly secured to a bolt 72 having a forked head with tines 74 and 76 depending therefrom. A roller 78 is mounted between tines 74 and 76 on a bearing 80 for imparting a thrust to the bolt 72, bushing 62, arm 64 and pin 66, by an axially slidable cam 82 bearing against roller 78 along a concaved surface 84. Cam 82 is slidable in a pair of tubular guides 86 and 88 secured, respectively, to ears 40 and 38 of bracket 36. Axial movement is imparted to cam 82 through a wire 90 secured at one end to the cam 82 and at the other end to the brake linkage 92 of the vehicle as shown more clearly in the schematic representation in Fig. 5 of the drawings. A suitable spring 94 is interposed between cam 82 and a plug 96 fixed in one end of guide 86 for returning cam 82 to its initial position as shown in Fig. 3 of the drawings, after having been displaced therefrom. It is noted that application of the vehicle brake to swing brake linkage arm 92 is effective to withdraw pin 66 from notch 68 to release quadrant 18 and the vehicle throttle through the components including cam 82, bolt 72, bushing 62 and arm 64, and permit a return thereof to initial position.

Sheath 16 extends from block 20 to the engine compartment of the automotive vehicle and it is preferably secured at some suitable spot to the engine block by a clamp 94. Wire 14 extends through sheath 16 and through a "stop" 96 securely applied to wire 16 by a set screw or other suitable means and through a block 98 threadedly engaging an arm 100 of the engine accelerator linkage. Block 96, by the movement of wire 14 abuts block 98 and moves the same to effect a setting of the engine throttle position through the throttle linkage. It is noted that arm 100 of the accelerator linkage is movable in response to accelerator pedal manipulation to open the throttle beyond the setting established by the throttle control mechanism.

For a further understanding of the operation of the invention it is assumed that it is desired to operate the automotive vehicle to which the invention is applied, at some constant, predetermined velocity requiring some constant engine speed. It is, therefore assumed that pin 66 is engaged with friction plate 50 and quadrant 18 through the hole and notch therein and that quadrant 18 is in its release or initial position. Accordingly, operating knob 34 is rotated to impart a pivotal motion to quadrant 18 through gears 32 and 26. Wire 14, attached to swivel block 20 which is mounted on and movable with quadrant 18, actuates throttle linkage 100 by means of engagement between blocks 96 and 98 as hereinabove explained to adjust the automobile throttle as desired. Engine speed and automobile velocity being obtained as desired, rotation of knob 34 is terminated and by a virtue of the engagement of quadrant 18 with pin 66 and friction plate 50, the position thereof is retained as manually set since the frictional engagement of plate 50 with bracket 12 is sufficient to prevent any return rotation under the influence of the spring applied to the throttle linkage.

It is next assumed that the automotive vehicle is being operated at constant velocity under control of this invention and that pursuant to some driving requirement the foot brake linkage 92 is actuated to apply the vehicle brakes. Wire 90, movable with linkage 92 is effective to slide cam 82 along guides 86 and 88 and cause roller 78 to be lowered as viewed in Figs. 3 and 4 by recessed portion 84 of rod 82. Forked bolt 72, bushing 62, arm 64 and pin 66 movable with roller 78 are similarly lowered and pin 66 is removed from engagement with quadrant 18 whereby the retaining force applied to quadrant 18 is released and under the influence of the conventional throttle linkage spring, the same is returned to its initial position. Knob 34 having once been turned to set the mechanism at some desired engine and vehicle speed may be turned in either direction from the set position to adjust for a different engine and vehicle speed.

In the event that the quadrant 18 should be returned to initial position by application of the vehicle brakes as herein described, a resetting of the throttle position by the present mechanism is effected by rotation of knob 34 sufficiently to align notch 68 with pin 66 to obtain engagement therebetween and then a mere rotation of knob 34 to the speed desired.

The control apparatus of this invention is preferably mounted on the vehicle dash board in any suitable manner by attachment of bracket 12 thereto, so that knob 34 is exposed within reach of the operator. A simple and easy manipulation of knob 34 by the operator effects a setting of the throttle to relieve the operator's foot to provide driving ease and comfort.

Having thus described this invention in such full, clear, concise and exact terms as to enable any person skilled in the art to which it pertains to make and use the same, and having set forth the best mode contemplated of carrying out this invention, I state that the subject matter which I regard as being my invenion is particularly pointed out and distinctly claimed in what is claimed, it being understood that equivalents or modifications of, or substitutions for, parts of the above specifically described embodiments of the invention may be made without departing from the scope of the invention as set forth in what is claimed.

I claim:

1. In an automotive vehicle having a spring biased throttle linkage, a throttle control apparatus comprising a mounting bracket having a guide member mounted thereon, a first disc pivotally mounted on said guide member, a friction follower disc engageable with said bracket, a latch arm pivotally mounted on said guide member and having a pin engageable with said friction follower disc and said first disc, a wire axially movable in response to pivotal movement of said first disc and being coupled to the spring biased vehicle throttle linkage, means including a pair of gears for rotating said first disc a predetermined amount from an initial position and means connected to the braking system of said vehicle for removing said pin from engagement with said first disc whereby said first disc is returned to initial position.

2. In an automotive vehicle having a spring biased throttle linkage, a throttle control apparatus comprising a mounting bracket having a centrally disposed guide member mounted thereon, a first disc pivotally mounted on said guide member having a gear quadrant along a portion thereof, a spring biased friction follower disc engageable with said bracket and being pivotally mounted on said guide member, a latch arm pivotally mounted on said guide member having a pin engageable with said friction follower disc and said first disc, a wire secured to a peripheral portion of said first disc and being axially movable in response to pivotal movement of said disc, a pinion shaft mounted for rotation adjacent the periphery of said first disc, a pinion on said shaft in meshed engagement with said gear quadrant and manual means to rotate the pinion and thereby rotate said first disc.

3. In an automotive vehicle having biased throttle and brake linkages, a throttle control apparatus comprising means including a pivotal disc for manually actuating said throttle linkage from an initial position, means including a pivotal arm having a pin thereon and a frictional disc coupled to said pivotal disc through said pin for retaining said pivotal disc in set position, means actuable by said brake linkage for retracting said pin to uncouple said pivotal disc from said frictional disc whereby said pivotal disc is released and returned to initial position under the influence of the biased throttle linkage.

4. In an automotive vehicle having a spring biased throttle and brake linkages, a throttle control apparatus comprising means including an apertured, manually pivotal disc having an initial position for actuating said throttle linkage from an initial position, means including an apertured frictional disc and a pivotal arm having a pin engaging the apertures in said discs to restrain pivotal movement thereof, means actuable by said brake linkage for removing said pin from engagement with said frictional disc and pivotal disc apertures whereby said pivotal disc is released and returned to initial position under the influence of the spring biased throttle linkage.

5. In an automotive vehicle having a brake linkage and a spring biased throttle linkage, a throttle control apparatus comprising a bracket and a guide member mounted thereon an apertured pivotal disc mounted on said guide member having an initial position, an apertured frictional disc pivotally mounted on said guide member and frictionally engaging said bracket, a pivotal arm mounted on said guide member and having a pin engaging the apertures in said pivotal and frictional discs to restrain pivotal movement thereof, means including a cam and follower connected to said brake linkage for removing said pin from engagement with the aperture in said pivotal disc whereby said pivotal disc is released and returned to initial position under the influence of the spring biased throttle linkage.

6. In an automotive vehicle having a brake linkage and a spring biased throttle linkage, a throttle control apparatus comprising a bracket and a guide member mounted thereon having an initial position, an apertured pivotal disc mounted on said guide member, an apertured frictional disc mounted on said guide member and frictionally engaging said bracket, a pivotal arm, axially movably mounted on said guide member and having a pin engaging the apertures in said pivotal and frictional discs to restrain pivotal movement thereof, means including a follower axially movable with said pivotal arm and a cam actuable by said brake linkage for removing said pin from engagement with the aperture in said pivotal disc whereby said pivotal disc is released and returned to initial position under the influence of the spring biased throttle linkage.

7. An automotive vehicle throttle control apparatus comprising a spring biased throttle linkage for actuating the vehicle throttle, a brake linkage, means including a pivotal disc having an initial position and a wire connected thereto for actuating said throttle linkage, said last mentioned means including a first block fastened to said wire and a second block fastened to said linkage for abutment with first block to actuate said throttle linkage against the throttle bias spring in response to axial movement of said wire, frictional means for retaining said pivoted disc in position and means actuable by said brake linkage for releasing said pivotal disc whereby said disc, wire and throttle linkage are returned to initial positions under the influence of said throttle spring.

References Cited in the file of this patent
UNITED STATES PATENTS

| | | |
|---|---|---|
| 1,375,436 | Young | Apr. 19, 1921 |
| 2,552,726 | Larson | May 15, 1951 |
| 2,586,435 | Peterman | Feb. 19, 1952 |
| 2,621,766 | Patrick | Dec. 16, 1952 |
| 2,626,026 | Sherwood et al. | Jan. 20, 1953 |
| 2,711,235 | Pokorny | June 21, 1955 |
| 2,747,426 | Robinson | May 29, 1956 |